US011257397B2

(12) United States Patent
Markin

(10) Patent No.: US 11,257,397 B2
(45) Date of Patent: Feb. 22, 2022

(54) TRANSESOPHAGEAL ECHOCARDIOGRAPHY SIMULATOR

(71) Applicant: Board of Regents of the University of Nebraska, Lincoln, NE (US)

(72) Inventor: Nicholas Markin, Omaha, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 204 days.

(21) Appl. No.: 16/616,599

(22) PCT Filed: Jun. 7, 2018

(86) PCT No.: PCT/US2018/036437
§ 371 (c)(1),
(2) Date: Nov. 25, 2019

(87) PCT Pub. No.: WO2018/226940
PCT Pub. Date: Dec. 13, 2018

(65) Prior Publication Data
US 2021/0150935 A1    May 20, 2021

Related U.S. Application Data

(60) Provisional application No. 62/517,236, filed on Jun. 9, 2017.

(51) Int. Cl.
*G09B 23/28*       (2006.01)
(52) U.S. Cl.
CPC .................... *G09B 23/285* (2013.01)
(58) Field of Classification Search
CPC ...................................................... G09B 23/285
See application file for complete search history.

(56) References Cited

U.S. PATENT DOCUMENTS

| 5,620,326 A | 4/1997 | Younker |
| 5,704,791 A | 1/1998 | Gillio |
| 2004/0060340 A1* | 4/2004 | Hibi ..................... G09B 23/306 73/1.86 |
| 2005/0004456 A1* | 1/2005 | Thomas ................. A61B 90/39 600/431 |
| 2009/0162820 A1* | 6/2009 | Tada .................... A61B 8/0883 434/272 |
| 2011/0170752 A1 | 7/2011 | Martin et al. |

(Continued)

OTHER PUBLICATIONS

International Search Report and Written Opinion in International Appln. No. PCT/US2018/36437, dated Aug. 20, 2018, 6 pages.

(Continued)

*Primary Examiner* — Robert P Bullington
(74) *Attorney, Agent, or Firm* — Fish & Richardson P.C.

(57) ABSTRACT

A simulator system can be used to train personnel regarding transesophageal echocardiography (TEE) performance techniques. TEE is an ultrasonic imaging modality that can be used to capture images of a subject's heart. An imaging probe is inserted into the esophagus of the subject and positioned/aimed toward the subject's heart to capture the images. The TEE training system described is a system for ultrasonic diagnosis training (e.g., targeting the heart) which can be operated using an actual echocardiography machine used in clinic setting, and allows the practice of both acquisition and manipulation of images by the user so as to provide multiple aspects of learning 3D TEE.

20 Claims, 5 Drawing Sheets

(56) References Cited

U.S. PATENT DOCUMENTS

2012/0082969 A1     4/2012   Schwartz et al.
2021/0350723 A1*   11/2021   Pirlot .................. G09B 23/303

OTHER PUBLICATIONS

International Preliminary Report on Patentability in International Appln. No. PCT/US2018/036437, dated Dec. 19, 2019, 6 pages.

* cited by examiner

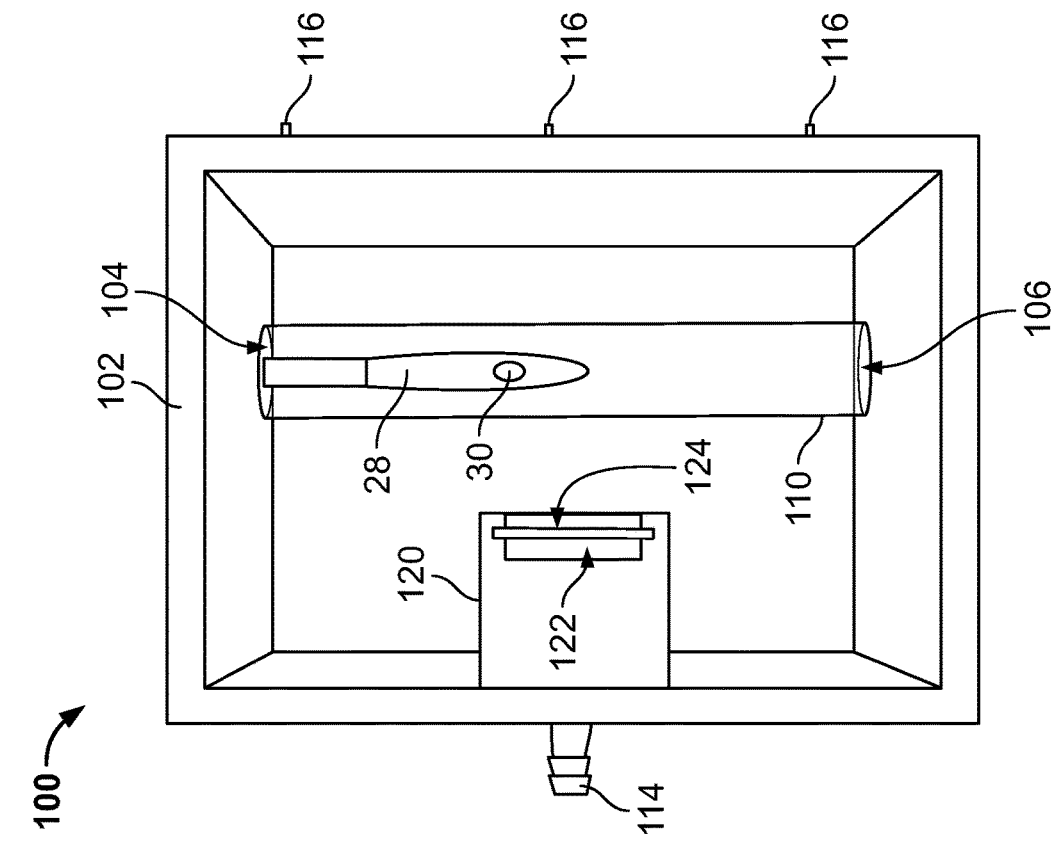
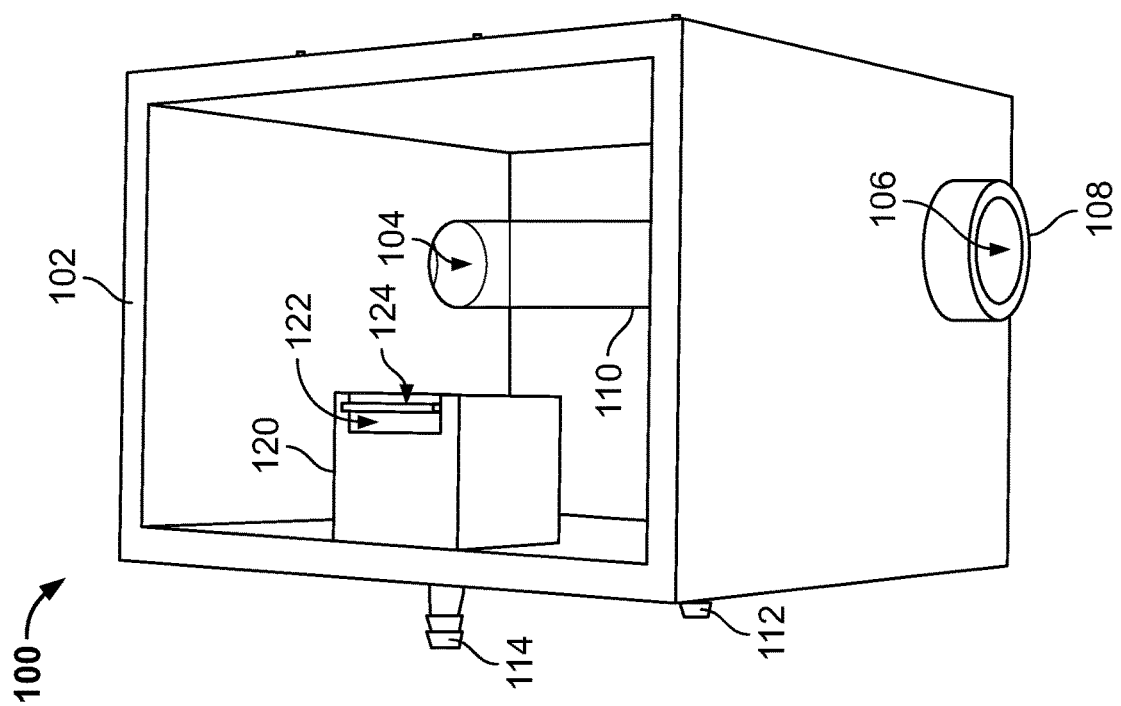

TRANSESOPHAGEAL ECHOCARDIOGRAPHY SIMULATOR

CROSS REFERENCE TO RELATED APPLICATION

This application is a National Stage application under 35 U.S.C. § 371 of International Application No. PCT/US2018/036437, having an International Filing Date of Jun. 7, 2018, which claims the benefit of U.S. Provisional Ser. No. 62/517,236 filed Jun. 9, 2017. This disclosure of the prior application is considered part of (and is incorporated by reference in) the disclosure of this application.

BACKGROUND

1. Technical Field

This document relates to methods and materials for improving training for 3D transesophageal echocardiography (TEE). For example, this document relates to methods and devices for an educational simulator for learning how to perform 3D TEE techniques.

2. Background Information

Transesophageal echocardiography (TEE) is a method for capturing imaging of the heart, using ultrasonic diagnosis techniques. An imaging probe is inserted into the esophagus and positioned toward the heart to capture images of the heart. TEE can be used to capture standard 3D images, as well as Color-Flow Doppler 3D images. These images can then be analyzed to take measurements of various anatomical features of the heart, determine an amount of regurgitation of a heart valve, a size and number of openings causing regurgitation, or other desired measurements and assessments.

SUMMARY

This document describes methods and materials for improving training for 3D transesophageal echocardiography (TEE). For example, this document describes methods and devices for an educational simulator for learning 3D TEE operation techniques.

In one aspect, this disclosure is directed to a transesophageal echocardiography (TEE) simulator. The TEE simulator can include a reservoir defining an interior space configured to sealably contain a liquid, and a simulated esophagus tube extending within the interior space, where at least a portion of the simulated esophagus tube is echolucent. The simulated esophagus tube can define a lumen and an open end for receiving a transesophageal echocardiography probe into the lumen, and the simulated esophagus tube can be sealed in relation to the interior space such that, while the echolucent portion of the simulated esophagus tube is submerged in the liquid contained in the interior space, the liquid is prevented from entering the lumen. The TEE simulator can also include a physical model support coupled to the housing, the physical model support configured to couple a physical model in the interior space above the simulated esophagus tube.

In some cases, the liquid can be a blood simulant. In some cases, the physical model support can be configured to couple the physical model in the interior space above the simulated esophagus tube interior space relative to the echolucent portion of the simulated esophagus tube.

In some cases, the TEE simulator can include a pump, where the pump is plumbed to draw the liquid from the interior space of the reservoir and to supply the liquid to the physical model. In some cases, the physical model can be configured to emit the liquid supplied to the physical model by the pump. In some cases, the physical model can be positioned to emit the liquid supplied to the physical model by the pump towards the simulated esophagus tube. In some cases, the pump can be a peristaltic pump. In some cases, the TEE simulator can include a control system that can be configured to run the pump in a pulsatile manner.

In some cases, the control system can be configured to output one or more signals that simulate an electrocardiogram. In some cases, the control system can be configured to coordinate timing of: (i) the output of the one or more signals that simulate the electrocardiogram and (ii) the pulsatile manner of the pump. In some cases, the physical model can simulate a heart valve with regurgitation. In some cases, the physical model can simulate a heart valve with endocarditis.

In another aspect, this disclosure is directed to a method of training a person to perform transesophageal echocardiography (TEE). The method can include positioning a physical model within an interior space of a reservoir of a TEE simulator, inserting a TEE probe into a lumen of a simulated esophagus tube extending within the interior space, the simulated esophagus tube including an echolucent portion, filling the interior space with a blood simulant liquid so that the physical model and the echolucent portion of the simulated esophagus tube are submerged in the blood simulant liquid, and manipulating the TEE probe to capture images of the physical model through the echolucent portion of the simulated esophagus tube while the physical model and the echolucent portion of the simulated esophagus tube are submerged in the blood simulant liquid.

In some cases, the method can include determining a parameter of the physical model. In some cases, the parameter can be a size, a depth relationship, a lateral plane measurement, an elevational plane measurement, or a depth plane measurement. In some cases, the parameter can be a measurement of jet flow, a size of an aperture, a location of an aperture, a number of apertures, a shape of an aperture, or a level of regurgitation. In some cases, the method can include removing the physical model from the interior space of the reservoir of the TEE simulator, positioning a second physical model within the interior space of the reservoir of the TEE simulator, and manipulating the TEE probe to capture images of the second physical model through the echolucent portion of the simulated esophagus tube while the second physical model and the echolucent portion of the simulated esophagus tube are submerged in the blood simulant liquid.

In yet another aspect, this disclosure is directed to a transesophageal echocardiography (TEE) simulator. The TEE simulator can include a reservoir defining an interior space configured to sealably contain a blood simulant liquid, and a simulated esophagus tube extending within the interior space, where at least a portion of the simulated esophagus tube is echolucent. The simulated esophagus tube can define a lumen and an open end for receiving a transesophageal echocardiography probe into the lumen, and the simulated esophagus tube can be sealed in relation to the interior space such that, while the echolucent portion of the simulated esophagus tube is submerged in liquid contained in the interior space, the liquid is prevented from entering the lumen. The TEE simulator can also include a physical model that can be positionable in the interior space in an aligned and spaced apart relationship relative to the echolucent portion of the simulated esophagus tube.

In some cases, the TEE simulator can include a pump, where the pump is plumbed to draw the liquid from the interior space of the reservoir and to supply the liquid to the physical model. In some cases, the physical model can simulate a heart valve with regurgitation.

Particular embodiments of the subject matter described in this document can be implemented to realize one or more of the following advantages.

First, the TEE educational simulator can provide a training modality and a platform for practicing with a TEE machine without the need to practice on a patient. Accordingly, the training using the TEE educational simulator can take place in an environment that is dedicated to the student's learning process, and without the added time stress or complications associated with an actual patient scenario.

Second, the TEE educational simulator can be used with any TEE machine and probe. This can be beneficial to learn a new machine for TEE when switching machines and/or for people who are learning to use a TEE machine for the first time. For example, different companies that make TEE machines can have different means of providing similar functionality, and/or different layouts, such that learning a new machine may take a bit of practice.

Third, the TEE educational simulator can be oriented such that the procedure when practicing is quite similar to an actual procedure. For example, the model heart components, or other elements to be imaged, can be located above the artificial esophagus, similar to a heart being located above the esophagus during a live procedure. Optionally, the TEE educational simulator can also be used in either orientation (e.g., entering from the right or the left).

Fourth, the TEE educational simulator can mimic human mechanics and/or physiology to provide for a realistic training experience. For example, the artificial esophagus can have similar characteristics as a real esophagus. In addition, the esophagus can be suspended in a solution with properties similar to blood. Further, the TEE educational simulator can pump the blood like solution to simulate a beating heart.

Fifth, the TEE educational simulator can be used to practice obtaining image characteristics, such as measurements, orientation, identification, and/or classification of various features of the heart.

Sixth, when practicing with the TEE educational simulator, a model that is being imaged can be changed to allow practice with different models. For example, a model with a single regurgitation hole, a model with multiple regurgitation holes, a model with different shapes and/or sizes of regurgitations holes, or a combination thereof, can all be simulated.

Seventh, when practicing with various models in the TEE educational simulator, the imaging results and determined characteristics can be checked for accuracy because the dimensions and characteristics of the model are known.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods and examples are illustrative only and not intended to be limiting.

The details of one or more embodiments of the invention are set forth in the accompanying drawings and the description below. Other features, objects, and advantages of the invention will be apparent from the description, drawings, and from the claims.

DESCRIPTION OF DRAWINGS

FIG. 2 is a perspective view of an example transesophageal echocardiography educational simulator of the transesophageal echocardiography training system of FIG. 1, in accordance with some embodiments provided herein.

FIG. 3 is a top perspective view of the transesophageal echocardiography educational simulator of FIG. 2, in accordance with some embodiments provided herein.

Like reference numbers represent corresponding parts throughout.

DETAILED DESCRIPTION

This document describes methods and materials for improving training for 3D transesophageal echocardiography (TEE). For example, this document describes methods and devices for an educational simulator for learning 3D TEE performance techniques.

Transesophageal echocardiography (TEE) is a process for capturing imaging of the heart using ultrasonic imaging techniques. An imaging probe is inserted into the esophagus of a subject and positioned/aimed toward the subject's heart to capture images of the heart. TEE can be used to capture standard 3D images, as well as Color-Flow Doppler 3D images. These images can then be analyzed to take measurements of various anatomical features of the heart, determine an amount of regurgitation of a heart valve, a size and number of openings causing regurgitation, or other desired measurements.

Referring generally to the figures, a TEE training system is a system for ultrasonic diagnosis training (e.g., targeting the heart) which can be operated using an actual echocardiography machine used in clinic setting, and allows the practice of both acquisition and manipulation of images by the user and can provide multiple aspects of learning 3D TEE.

The TEE training system can be used to learn standard 3D imaging techniques, which can require a user to find an area, or item, of interest in 2D imaging, and then change to 3D imaging to view the area, or item, of interest. For example, a model (e.g., as shown in FIGS. 6-10) can be placed in the TEE educational simulator, which provides a structure to look at in 3D. By providing model components that contain means to acquire images of objects by having an appropriate return signal, a user can learn to measure and manipulate 3D objects, recognize structures, determine size and depth relationships, as well as measure lateral planes, elevation planes, and depth planes.

Figure 6:
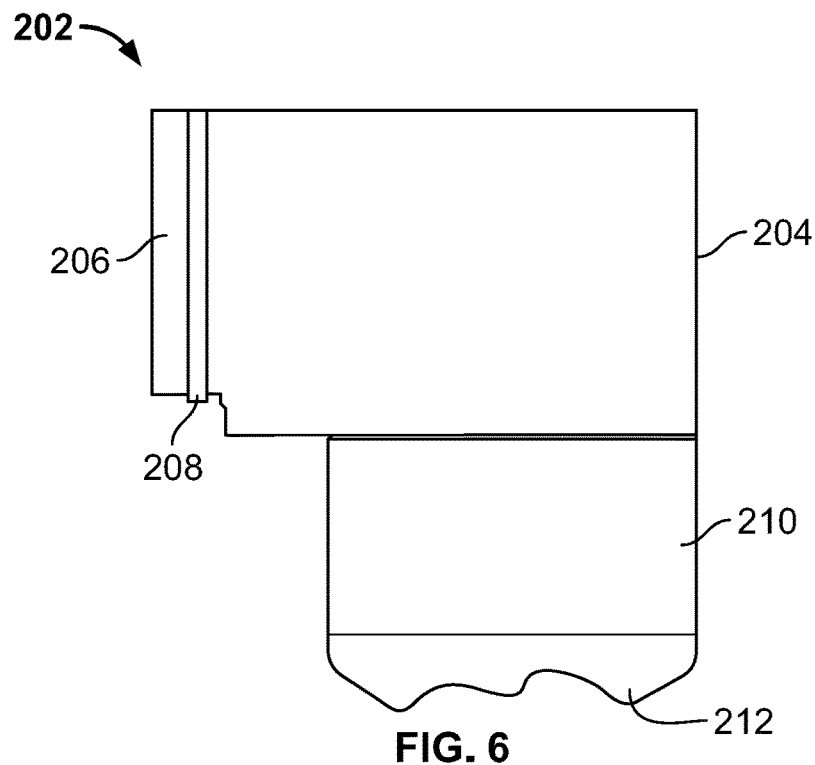
FIG. 6 is a side view of an example cardiac valve model for use with the transesophageal echocardiography educational simulator of FIG. 2, in accordance with some embodiments provided herein.
Figure 7:
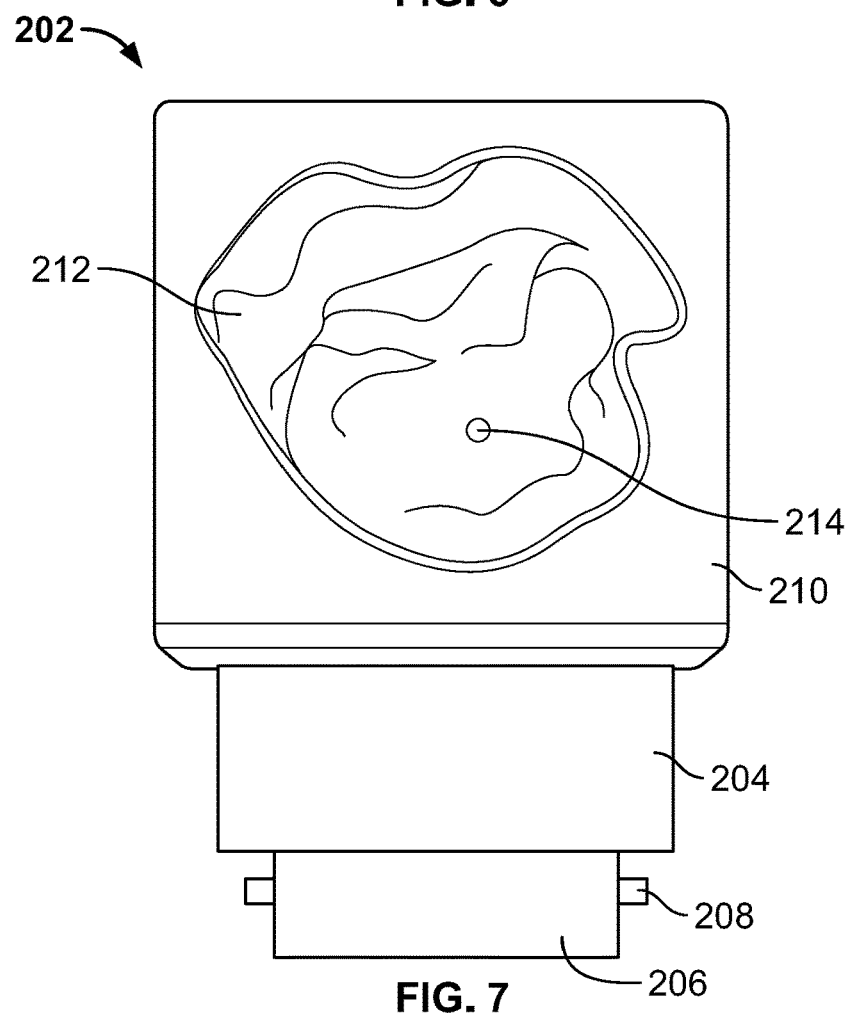
FIG. 7 is a bottom view of the cardiac valve model of FIG. 6, in accordance with some embodiment provided herein.

The TEE training system 10 can be used to learn Color-Flow Doppler 3D imaging. For example, a multi-beat volume of the "heart" (e.g., models as shown in FIGS. 6 and 7) can be obtained. When doing such a procedure, a patient cannot breathe or move; therefore, the TEE training system 10 is well-suited for training. By providing a pump capable of providing clinically standard ranges of pulsatility through a model and a control system providing measurable electrical activity, the pump and electrical activity can be timed together for 3D image gating. This system can be used with an echocardiography machine to record and gather flow information for a user to learn how to find the area of regurgitation and measure the area following image acquisition. By modifying a model located in the TEE educational simulator, accuracy can be easily determined by comparing known valves of the model to valves determined using standard 3D imaging (e.g., measurements), and/or Color-Flow Doppler 3D imaging.

Accordingly, the TEE training system described herein facilitates training using a transesophageal echocardiography probe to perform both standard 3D imaging and 3D imaging with Color-Flow Doppler images, which enables a user to learn a sequence of steps required for image acquisition on an echocardiography machine that will be used in a clinical setting.

Figure 1:
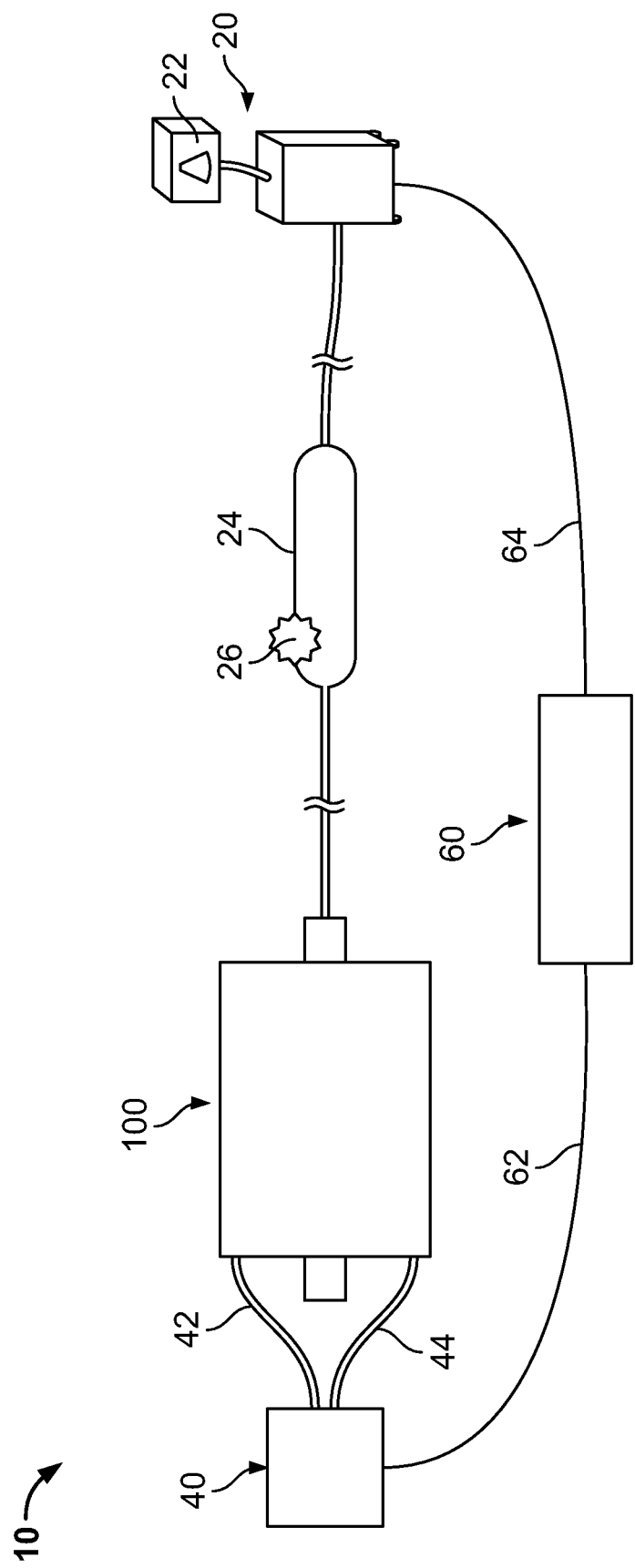
FIG. 1 is a schematic diagram of an example transesophageal echocardiography (TEE) training system, in accordance with some embodiments provided herein.

Referring to FIG. 1, a TEE training system 10 in accordance with some embodiments can include an echocardiography machine 20, a TEE educational simulator 100, and a pump 40. Optionally, TEE training system 10 can also include a control system 60. The TEE educational simulator 100 will be described in more detail with respect to FIGS. 2-5, for example.

Echocardiography machine 20 can be any type of echocardiography machine, such as a particular type of machine used for procedures by a particular healthcare organization that is providing the training. Echocardiography machine 20 can include a display 22, a probe (not shown), and a probe controller 24. Display 22 can provide images and tools for taking measurements and gathering information. Probe controller 24 can be coupled to echocardiography machine 20 and the ultrasound probe (not shown) for insertion into TEE educational simulator 100. Probe controller 24 can include a knob 26 to modify settings or make adjustment to the probe during use.

Pump 40 can pump a liquid (e.g., a blood simulant) to and from TEE educational simulator 100. Accordingly, pump 40 can include an inlet tube portion 42 to provide liquid to TEE educational simulator 100, and an outlet tube portion 44 to remove liquid from TEE educational simulator 100. As shown, in some embodiments inlet tube portion 42 can be located higher than outlet tube portion 44, such that liquid is removed from a bottom of TEE educational simulator 100 to limit visibility of liquid flow by reducing turbulence picked up by the ultrasound probe. In some cases, pump 40 can be a peristaltic pump, such as a roller pump with an on/off, pulsatile operational mode. Optionally, pump 40 can have adjustable speeds. For example, pump 40 can be set with a pulsatility to mimic systole (e.g., about 0.3 seconds to about 0.4 seconds) and/or diastole (e.g., about 0.6 seconds to about 0.7 seconds). In some cases, the liquid pumped through pump 40 can be a blood simulant liquid. For example, the blood simulant liquid can be a mixture of water, glycerin, and cornstarch. The blood simulant liquid can have properties similar to blood, such that the properties are mimicked.

In some embodiments, control system 60 can provide a simulated echocardiogram, to replicate a beating heart. Control system 60 can be connected to pump 40 via connection 62, and connected to echocardiography machine 20 via connection 64. In some cases, control system 60 can control pump 40 such that pump 40 pumps liquid to replicate a beating heart via the simulated echocardiogram. Optionally, control system 60 can control pulsatility and/or timing of pump 40. In some cases, control system 60 can allow for QRS gating, such that the echocardiography machine 20 can sync a frame rate, and therefore a frame, to a heartbeat. In some cases, control system 60 can allow echocardiography machine 20 to perform multiple beat acquisition.

Referring now to FIGS. 2-5, in some embodiments TEE educational simulator 100 can include a housing 102, a simulated esophagus tube 110, a model support 120, and a model 200.

Housing 102 can be a reservoir defining an interior space for holding a liquid (such as the blood simulant liquid described above), and can include apertures 104 and 106, and pump couplers 112 and 114. Housing 102 can have any suitable length (e.g., between the sides with apertures 104 and 106) and width. In some cases, the length of housing 102 is approximately 20 to 80 centimeters and the width of housing 102 is approximately 15 to 40 centimeters.

Apertures 104 and 106 are located on opposite sides of housing 102 directly across from one another so as to allow the connection of a simulated esophagus tube 110 there between. During the use of TEE educational simulator 100, a transesophageal echocardiography (TEE) probe 28 (which includes a camera 30) can be received within simulated esophagus tube 110. Optionally, apertures 104 and 106 are located on a lower portion of housing 102 and can be centered about the width of housing 102, or offset from a center of the width of housing 102.

In some cases, housing 102 includes an internal coupler 118 and/or an external coupler 108 to aid in coupling simulated esophagus tube 110 to housing 102. For example, external coupler 108 can be a male coupler and internal coupler 118 can be a female coupler such that external coupler 108 and internal coupler 118 mate in apertures 104 and 106. In some cases, simulated esophagus tube 110 can pass through internal coupler 118, external coupler 108 and wrap back around external coupler 108. Simulated esophagus tube 110 can be secured to external coupler 108 via an open plug (e.g., an element that inserts into external coupler 108, and optionally around external coupler 108, with an aperture to maintain an opening through aperture 104 or 106). In some cases, a sealant is used between and/or around external coupler 108 and housing 102, and internal coupler 118 and housing 102 to prevent leaks. Optionally, a closed plug (e.g., a plug as described above, but without an opening) can be inserted in aperture 104 and/or aperture 106. For example, the plug can limit debris from entering simulated esophagus tube 110 when not in use. As another example, a single plug can be inserted into aperture 104 and/or aperture 106 to limit passage of TEE probe 28 (i.e., to prevent TEE probe 28 from passing from aperture 104 to aperture 106 or vice versa). In some cases, plugs (e.g., open plug and closed plug) can be removable from external coupler 108 and/or apertures 104 and 106.

In some embodiments, simulated esophagus tube 110 can be a flexible tube with a thin wall that extends between aperture 104 and aperture 106 and can receive TEE probe 28. In some cases, simulated esophagus tube 110 can be relatively taunt between aperture 104 and aperture 106 inside housing 102 to replicate an esophagus, which is relatively fixed in space, but flexible enough to allow passage and manipulation of TEE probe 28. Simulated esophagus tube 110 can be echolucent to permit passage of ultrasound waves from TEE probe 28 through simulated esophagus tube 110. In some cases, simulated esophagus tube 110 has a diameter of approximately 5 centimeters, and a wall thickness of approximately 0.05 to 0.1 mm. Such a diameter can be consistent with the opening of a human mouth to replicate passage of TEE probe 28 into an esophagus in a clinical setting. Simulated esophagus 110 can be submerged in the blood simulant liquid while an interior of simulated esophagus 110 remains dry to prevent TEE probe 28 from interacting directly with the blood simulant liquid. In some cases, ultrasonic gel can be used when inserting TEE probe 28 into simulated esophagus tube 110 to prevent sticking and puncturing. Optionally, simulated esophagus tube 110 can be removable, such that simulated esophagus tube 110 can be replaced if damaged.

Pump couplers 112 and 114 can provide means for securing outlet tube portion 44 and inlet tube portion 42 of pump 40, respectively, such that liquid is pumped into housing 102 via pump coupler 114 and out of housing 102 via pump coupler 112. In some cases, pump couplers 112 and 114 can be barbed or threaded to aid in coupling outlet tube portion 44 and inlet tube portion 42 to pump couplers 112 and 114, respectively. Optionally, pump coupler 112 can be located in a bottom portion of housing 102 and pump coupler 114 can be located in an upper portion of housing 102, such that pump coupler 114 is above pump coupler 112. In some cases, positioning pump coupler 114 above apertures can aid TEE probe 28 in capturing fluid ejected from pump coupler 114, with the orientation of camera 30 facing upward. In some cases, pump coupler 114 is aligned with model support 120, such that fluid from pump coupler 114 passes through model support 120 when getting pumped into housing 102. Optionally, pump coupler 112 can be positioned at the same level or below apertures 104 and 106, and therefore below simulated esophagus tube 110 to reduce the turbulence caused by the pump coupler 112 that is captured by TEE probe 28.

In some cases, pump couplers 112 and 114 are located in the same axis perpendicular to the bottom of housing 102, such that pump coupler 114 is directly above pump coupler 112. Optionally, pump couplers 112 and 114 can be located in different axes perpendicular to the bottom of housing 102. For example, pump coupler 114 can be positioned along an axis to align with a desired location of TEE probe 28, while pump coupler 112 can be positioned along an axis spaced away from the desired location of TEE probe 28. Positioning pump coupler 114 to align with the desired location of TEE probe 28 can aid TEE probe 28 in capturing fluid ejected from pump coupler 114. Offsetting pump coupler 112 from the desired location of TEE probe 28 can reduce the turbulence caused by the pump coupler 112 that is captured by TEE probe 28.

Optionally, housing 102 can include a removable cover (not shown). The cover can prevent a user from seeing the components of TEE educational simulator 100, and therefore more accurately replicate a clinical setting. The cover can be removed to change the model 200. In some cases, the cover can limit contamination of the blood simulant liquid, which can help prevent clogs, turbulence, and haziness of images.

In some cases, housing 102 can include mounting members 116 on an exterior of housing 102. Mounting members 116 can mount control system 60 (as shown in FIG. 1). For example, control system 60 can be a circuit board that is an ECG simulator, and the circuit board can include holes that mounting members 116 can extend through, allowing control system 60 to be mounted to housing 102. Optionally, mounting members 116 can be hooks, grooves, slots, protrusions, supports, or other structures to facilitate mounting of various configurations of control systems.

Figure 5:
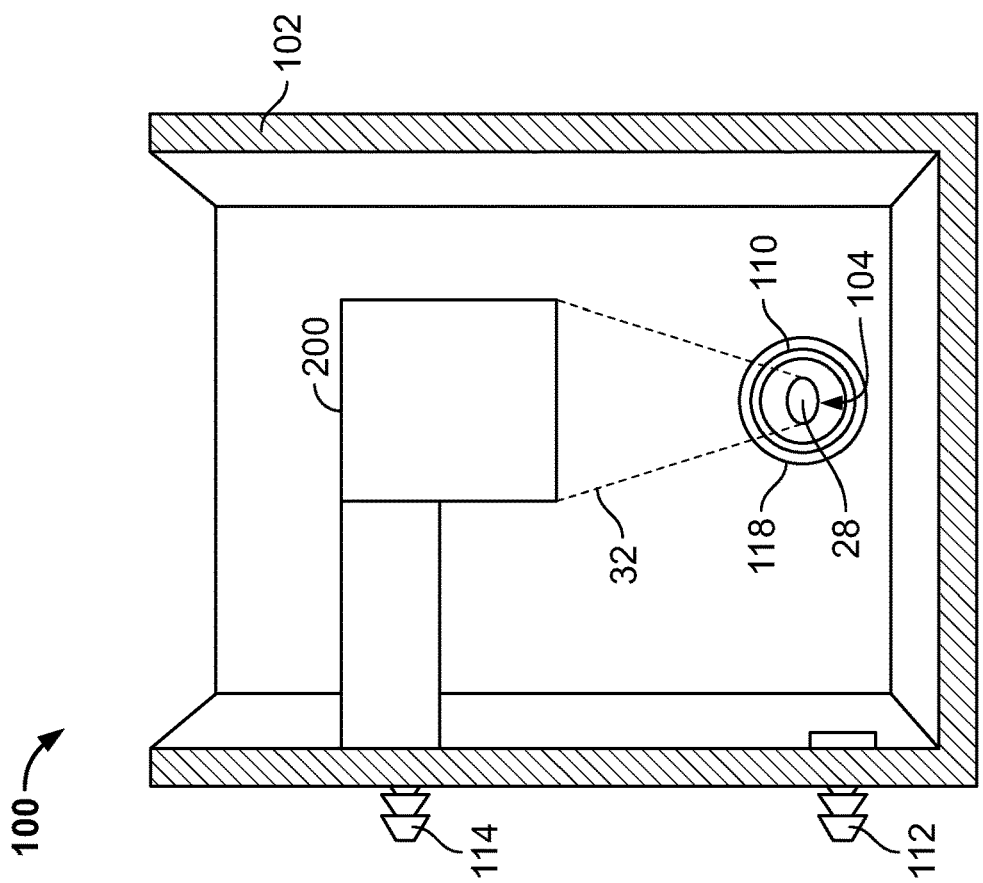
FIG. 5 is a cross-sectional interior side view of the transesophageal echocardiography educational simulator of FIG. 2, in accordance with some embodiments provided herein.
Figure 4:
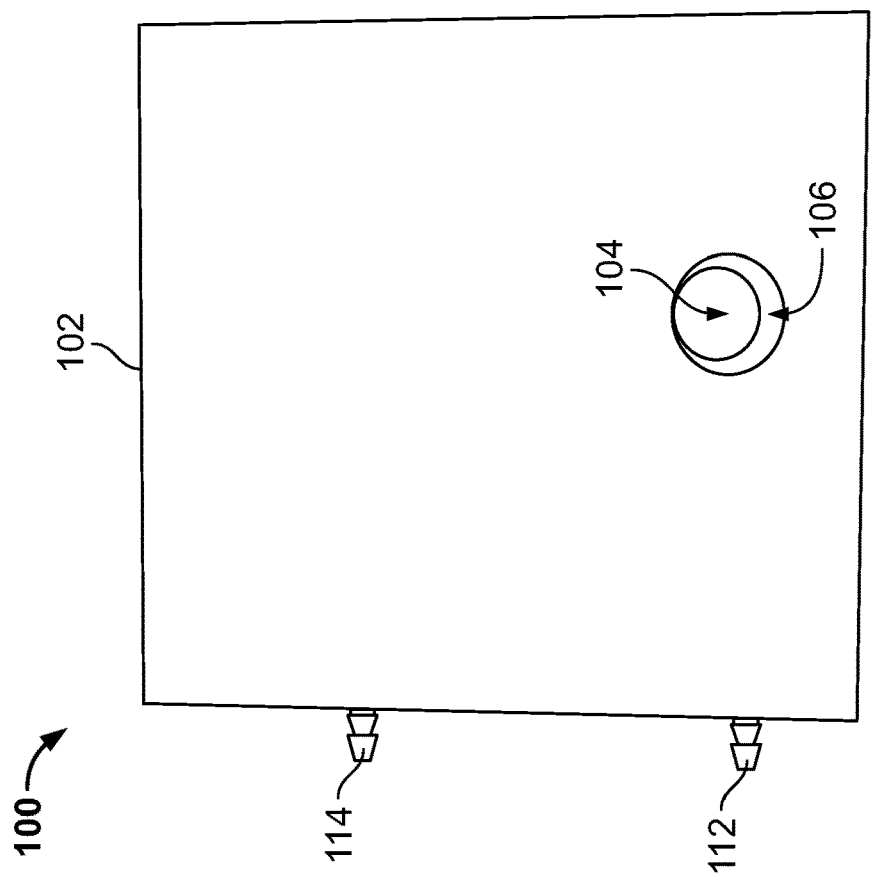
FIG. 4 is a side view of the transesophageal echocardiography educational simulator of FIG. 2, in accordance with some embodiments provided herein.

Model support 120 provides a structure for coupling one of a plurality of different types of models 200 to TEE educational simulator 100. In some cases, model support 120 can extend from a side of housing 102 that does not include aperture 104 or 106. Optionally, model support 120 can be positioned opposite pump coupler 114. In such a case, model support 120 can include a lumen extending through model support 120 to allow passage of liquid from pump coupler 114 (and therefore pump 40) into housing 102. In some cases, model support 120 is positioned below a top of housing 102 (e.g., as shown in FIG. 5), such that the blood simulant liquid fully submerges model support 120 and model 200.

In some cases, model support 120 can be located in approximately a center of the length of housing 102. For example, when model support 120 is located in approximately the center of the length of housing 102, TEE probe 28 can be inserted through aperture 104 or aperture 106, allowing bi-directional use of the TEE educational simulator, while providing symmetric depths of model support 120. For example, housing 102 can have a length of approximately 60 to 80 centimeters, with model support 120 being located at about 30 to 40 centimeters. By positioning model support 120 approximately 30 to 40 centimeters from apertures 104 and 106, the depth of insertion of TEE probe 28 would be consistent with the depth used in a clinical setting with a human patient.

Optionally, model support 120 can be offset, such that model support 120 is closer to one of aperture 104 or 106 than the other of aperture 104 or 106. For example, model support 120 can be positioned approximately 30 to 40 centimeters from the side of housing 102 with aperture 104 or aperture 106, while the distance between the other of aperture 104 or aperture 106 is approximately 10 to 20 centimeters, such that housing 102 has a length of approximately 40 to 60 centimeters. By offsetting model support 120, housing 102 can be smaller to save space, while also providing a realistic representation of a depth of insertion of TEE probe 28.

Model 120 can have a length such that attachment of model 200 causes a base of model 200 facing simulated esophagus tube 110 to be directly above simulated esophagus tube 110. Optionally, model 120 can have a length such that attachment of model 200 causes a base of the model 200 facing simulated esophagus tube 110 to be slightly offset from being directly above simulated esophagus tube 110.

Accordingly, when TEE probe 28 is inserted into simulated esophagus tube 110 (e.g., as shown in FIGS. 3 and 5), camera 30 can be positioned such that a field of ultrasound waves 32 of camera 30 can capture the base of model 200 to provide an image of model 200 to the echocardiography machine 20. Such an orientation between model 200 and TEE probe 28 can replicate the orientation of the heart and esophagus in a clinical setting to aid in learning the proper orientation of TEE probe 28 to ensure camera 30 captures the heart.

Model support 120 can include a recess 122 and a groove 124 to couple model 200 to model support 120. Recess 122 can receive a portion of model 200 and provide mechanical stability in order to hold model 200 in model support 120 and suspended above simulated esophagus tube 110. Groove 124 can receive a protrusion extending around a portion of model 200, such that model 200 is locked into place. In some cases, recess 122 and groove 124 can aid in determining a correct orientation of model 200, and therefore aid in aligning a lumen of model support 120 with a lumen of model 200. Optionally, recess 122 and groove 124 can aid sealing the coupling between model support 120 and model 200 to reduce leaking, which may cause undesired movement.

Various models 200 can be used interchangeably by sliding different models 200 in and out of recess 122, providing a plurality of training and learning opportunities.

Referring to FIGS. 6 and 7, an example cardiac valve model 202 can include a body 204 and a base 210. Cardiac valve model 202 can contain the means to acquire images of objects by having components have an appropriate ultrasound return signal, or lack thereof.

Body 204 can include a connection region 206 and a protrusion 208 for coupling with model support 120, as shown in FIGS. 2-5. Body 204 can have a length such that valve model 202 can be located directly over simulated esophagus tube 110. Optionally, body 204 can have a length such that valve model 202 is offset from simulated esophagus tube 110. For example, body 204 can have a length such that the camera 30 on probe 28 must be rotated to a certain angle (e.g., 5 degrees to 60 degrees from an axis orthogonal to the bottom of TEE educational simulator 100) to capture cardiac valve model 202. Protrusion 208 can extend along one, two, or three side of connection region 206. Base 210 can extend from body 204, such that model 202 can extend towards simulated esophagus tube 110.

Optionally, base 210 can include a valve model 212. In some cases, base 210 can have a length such that valve model 212 is approximately 4-6 centimeters from the simulated esophagus tube 110, such that the distance between valve model 212 and simulated esophagus tube 110 is similar to the distance between a human mitral valve and a human esophagus. In some embodiments, valve model 212 can be a simulated mitral valve, tricuspid valve, aortic valve, or other cardiac structure. In some cases, valve model 212 can be modeled from a 3D image of an actual native heart valve, such that valve model 212 is anatomically accurate. Optionally, model 212 can simulate an intra atrial septum, a left atrial appendage, pulmonary veins, and/or other anatomy.

In some cases, valve model 212 can include an aperture 214. Aperture 214 can allow liquid to pump out of pump 40 into TEE educational simulator 100. When valve model 212 includes aperture 214, a lumen extends through cardiac valve model 202 to allow liquid to pass through cardiac valve model 202 to aperture 214. In some cases, aperture 214 can simulate valve regurgitation. Optionally, aperture 214 can have a variety of sizes and/or shapes (e.g., circle, oblong, rectangle, etc.) to simulate various types of regurgitation. In some cases, valve model 212 can include more than one aperture 214 to simulate multiple openings that cause valve regurgitation. Optionally, aperture 214 can be located in valve model 212 such that liquid is ejected from aperture 214 towards simulated esophagus tube 110, and therefore probe 28, similar to regurgitation of a human heart valve with respect to the esophagus. In some cases, if valve model 212 includes multiple apertures 214, some apertures can be positioned such that the liquid is ejected away from probe 28 to reduce pressure while avoiding interaction with the flow of interest. Additional apertures can be provided to allow similar stroke volume without causing pump 40 or cardiac valve model 202 to become over pressurized.

Optionally, cardiac valve model 202 can be placed in TEE educational simulator 100 to facilitate training for measuring anatomy of a cardiac valve. In some cases, such as when valve model 212 includes aperture 214, Color-Flow Doppler can be used to train people on how to measure jet flow. Optionally, a size, shape, number, and/or location of aperture 214 can be quantified. A level of regurgitation can be determined based on the quantification of parameters of aperture 214.

Figure 8:
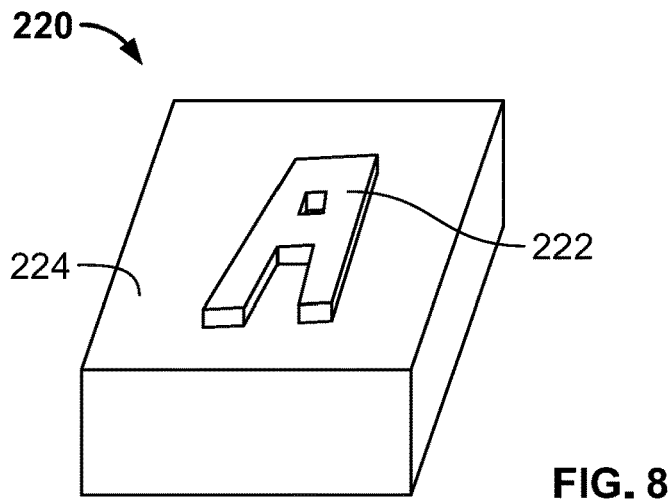
FIGS. 8-10 are bottom views of example models for use with the transesophageal echocardiography simulator of FIG. 2, in accordance with some embodiments provided herein.
Figure 9:
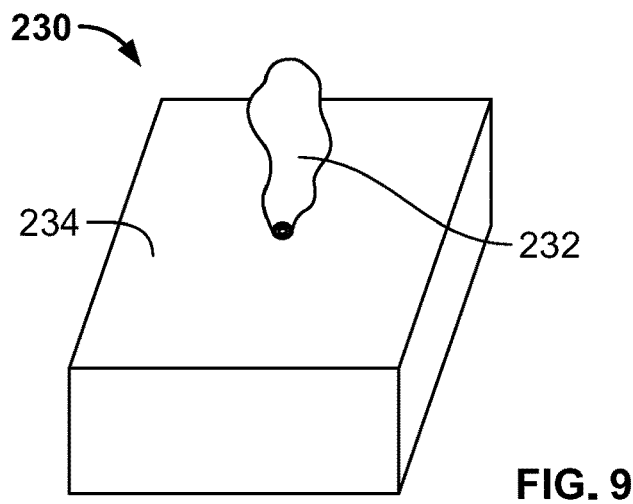
Figure 10:
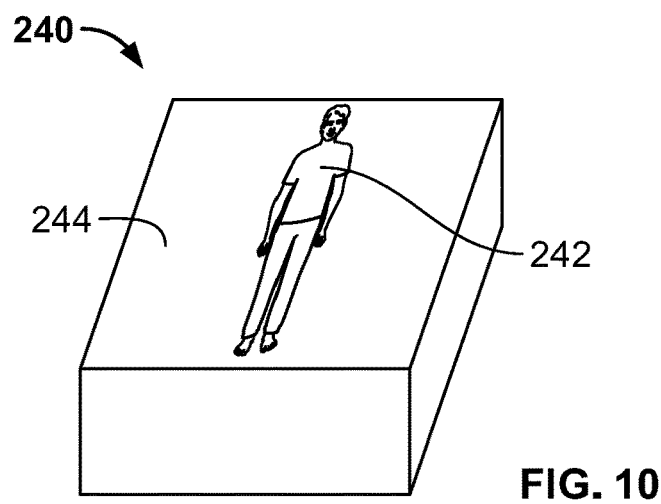

Referring to FIG. 8-10, models for use with the TEE training system 10 can include a variety of structures to aid with training. In some embodiments, these structural elements can be small echolucent figures that generate an appropriate return signal so that learners can practice 3D manipulation. The models can provide the means to acquire images of objects by having components have an appropriate ultrasound return signal, or lack thereof. In some cases, the models are formed from a single material. In some cases, the models are formed by combining components of varying materials. For example, a cardiac valve model can be made of an echogenic ballistics gel that is bound to a base of the model, made of a different material (e.g., plastic). Optionally, a model can be a mass to stimulate endocarditis, for example, as shown in FIG. 9.

As shown in FIG. 8, a model 220 can include a 3D element 222 with a simple and known shape, such as a letter of the alphabet, which is fixed to a base 224 of the model 220. A simple and known shape can be useful when learning how to identify objects and take simple measurements.

As shown in FIG. 9, a model 230 can include a 3D element 232, such as artificial vegetation, that is anchored to a base 234 of the model 230. The model 230 can also include an aperture (not shown) such that liquid can be pumped through the model 230, causing the element 232 to move and project from the base 234 of the model 230. Moving elements can be useful when learning how to identify and take measurement of a moving element. For example, such an element can be used to practice measuring latent, elevational, and depth planes.

As shown in FIG. 10, a model 240 can include a 3D element 242 with a more complex shape, such as a figurine, which is fixed to a base 244 of the model 240. A more complex shape can be useful when learning how to take more complex measurements or identify more challenging landmarks.

In some cases, a single model can include different elements on different faces of the base of the model, such that rotation of the model in model support 120 can provide different imaging opportunities. This can aid in saving time when changing imaging elements and/or reduce storage needs for TEE training system 10.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the process depicted in the accompanying figures do not necessarily require the particular order shown, or sequential order, to achieve desirable results. In certain implementations, multitasking and parallel processing may be advantageous.

What is claimed is:

1. A transesophageal echocardiography (TEE) simulator, comprising:
    a reservoir defining an interior space configured to sealably contain a liquid;
    a simulated esophagus tube extending within the interior space, at least a portion of the simulated esophagus tube being echolucent, the simulated esophagus tube defining a lumen and an open end for receiving a transesophageal echocardiography probe into the lumen, the simulated esophagus tube being sealed in relation to the interior space such that, while the echolucent portion of the simulated esophagus tube is submerged in the liquid contained in the interior space, the liquid is prevented from entering the lumen; and
    a physical model support coupled to the reservoir, the physical model support configured to be submerged in the liquid contained in the interior space and to couple a physical model in the interior space above the simulated esophagus tube.

2. The TEE simulator of claim 1, wherein the liquid is a blood simulant.

3. The TEE simulator of claim 1, wherein the physical model support is configured to couple the physical model in the interior space above the simulated esophagus tube interior space relative to the echolucent portion of the simulated esophagus tube.

4. The TEE simulator of claim 1, further comprising a pump, wherein the pump is plumbed to draw the liquid from the interior space of the reservoir and to supply the liquid to the physical model.

5. The TEE simulator of claim 4, wherein the physical model is configured to emit the liquid supplied to the physical model by the pump.

6. The TEE simulator of claim 5, wherein the physical model is positioned to emit the liquid supplied to the physical model by the pump towards the simulated esophagus tube.

7. The TEE simulator of claim 4, wherein the pump is a peristaltic pump.

8. The TEE simulator of claim 4, further comprising a control system that is configured to run the pump in a pulsatile manner.

9. The TEE simulator of claim 8, wherein the control system is configured to output one or more signals that simulate an electrocardiogram.

10. The TEE simulator of claim 9, wherein the control system is configured to coordinate timing of: (i) the output of the one or more signals that simulate the electrocardiogram and (ii) the pulsatile manner of the pump.

11. The TEE simulator of claim 1, wherein the physical model simulates a heart valve with regurgitation.

12. The TEE simulator of claim 1, wherein the physical model simulates a heart valve with endocarditis.

13. A method of training a person to perform transesophageal echocardiography (TEE), the method comprising:
    positioning a physical model within an interior space of a reservoir of a TEE simulator;
    inserting a TEE probe into a lumen of a simulated esophagus tube extending within the interior space, the simulated esophagus tube including an echolucent portion;
    filling the interior space with a blood simulant liquid so that the physical model and the echolucent portion of the simulated esophagus tube are submerged in the blood simulant liquid; and
    manipulating the TEE probe to capture images of the physical model through the echolucent portion of the simulated esophagus tube while the physical model and the echolucent portion of the simulated esophagus tube are submerged in the blood simulant liquid.

14. The method of claim 13, further comprising determining a parameter of the physical model.

15. The method of claim 14, wherein the parameter is a size, a depth relationship, a lateral plane measurement, an elevational plane measurement, or a depth plane measurement.

16. The method of claim 14, wherein the parameter is a measurement of jet flow, a size of an aperture, a location of an aperture, a number of apertures, a shape of an aperture, or a level of regurgitation.

17. The method of claim 13, further comprising:
    removing the physical model from the interior space of the reservoir of the TEE simulator;
    positioning a second physical model within the interior space of the reservoir of the TEE simulator; and
    manipulating the TEE probe to capture images of the second physical model through the echolucent portion of the simulated esophagus tube while the second physical model and the echolucent portion of the simulated esophagus tube are submerged in the blood simulant liquid.

18. A transesophageal echocardiography (TEE) simulator, comprising:
    a reservoir defining an interior space configured to sealably contain a blood simulant liquid;
    a simulated esophagus tube extending within the interior space, at least a portion of the simulated esophagus tube being echolucent, the simulated esophagus tube defining a lumen and an open end for receiving a transesophageal echocardiography probe into the lumen, the simulated esophagus tube being sealed in relation to the interior space such that, while the echolucent portion of the simulated esophagus tube is submerged in the blood simulant liquid contained in the interior space, the blood simulant liquid is prevented from entering the lumen; and a physical model that is positionable in the interior space in an aligned and spaced apart relationship relative to the echolucent portion of the simulated esophagus tube and configured to be submerged in the blood simulant liquid contained in the interior space.

19. The TEE simulator of claim 18, further comprising a pump, wherein the pump is plumbed to draw the liquid from the interior space of the reservoir and to supply the liquid to the physical model.

20. The TEE simulator of claim 18, wherein the physical model simulates a heart valve with regurgitation.

* * * * *